US012773972B2

(12) United States Patent
Binder et al.

(10) Patent No.: US 12,773,972 B2
(45) Date of Patent: Oct. 27, 2026

(54) METHOD AND DEVICE FOR DETERMINING A MOTOR REFERENCE TORQUE OF A MOTOR VEHICLE

(71) Applicant: ZF CV Systems Europe BV, Brussels (BE)

(72) Inventors: Hartmut Binder, Hannover (DE); Michael Knosmann, Hannover (DE); Youssef Swaid, Hannover (DE)

(73) Assignee: ZF CV Systems Europe BV, Brussels (BE)

( * ) Notice: Subject to any disclaimer, the term of this patent is extended or adjusted under 35 U.S.C. 154(b) by 56 days.

(21) Appl. No.: 18/988,638

(22) Filed: Dec. 19, 2024

(65) Prior Publication Data

US 2025/0115221 A1 Apr. 10, 2025

Related U.S. Application Data

(63) Continuation of application No. PCT/EP2023/063210, filed on May 17, 2023.

(30) Foreign Application Priority Data

Jun. 20, 2022 (DE) ..................... 10 2022 115 221.9

(51) Int. Cl.
*B60T 8/172* (2006.01)
*B60W 30/18* (2012.01)
*B60W 30/188* (2012.01)

(52) U.S. Cl.
CPC ....... *B60T 8/172* (2013.01); *B60W 30/18136* (2013.01); *B60W 30/188* (2013.01);
(Continued)

(58) Field of Classification Search
CPC .. B60T 8/172; B60T 2201/09; B60T 2250/02; B60W 30/18136; B60W 30/188;
(Continued)

(56) References Cited

U.S. PATENT DOCUMENTS 6,314,383 B1 11/2001 Leimbach et al.
10,697,381 B2 * 6/2020 Wilding .................. F02B 37/10
(Continued)

FOREIGN PATENT DOCUMENTS

DE 197 28 867 A1 1/1999
DE 10 2007 043 607 A1 3/2009
(Continued)

OTHER PUBLICATIONS

International Search Report of the European Patent Office dated Aug. 24, 2023 for international application PCT/EP2023/063210 on which this application is based.
(Continued)

*Primary Examiner* — Naeem Taslim Alam
(74) *Attorney, Agent, or Firm* — Walter Ottesen, P.A.

(57) ABSTRACT

A method is for determining the engine reference torque, used in a controller of a motor vehicle, of the engine of the motor vehicle, wherein the engine reference torque is determined by estimation. A value for the mass of the motor vehicle and a motor vehicle velocity value determined at each of two different times during acceleration of the motor vehicle are determined. An engine power of the engine is calculated from these values, and a value for the engine reference torque is estimated via the calculated engine power on the basis of power and torque curves, which are stored as a function of the speed of the engine.

18 Claims, 3 Drawing Sheets

(52) U.S. Cl.
CPC ....... *B60T 2201/09* (2013.01); *B60T 2250/02* (2013.01); *B60W 2510/0638* (2013.01); *B60W 2520/10* (2013.01); *B60W 2530/10* (2013.01); *B60W 2552/15* (2020.02)

(58) Field of Classification Search
CPC ..... B60W 2552/15; B60W 2510/0638; B60W 2520/10; B60W 2530/10
See application file for complete search history.

(56) References Cited

U.S. PATENT DOCUMENTS

| | | | | |
|---|---|---|---|---|
| 2010/0004809 | A1* | 1/2010 | Itoh | B60W 20/15 701/22 |
| 2010/0063704 | A1* | 3/2010 | Okubo | B60K 6/365 701/99 |
| 2010/0102767 | A1* | 4/2010 | Endo | B60L 3/003 318/473 |
| 2013/0054107 | A1* | 2/2013 | Harvie | G01G 19/086 701/99 |
| 2013/0311024 | A1* | 11/2013 | Tagawa | B60W 20/11 180/65.265 |
| 2013/0317687 | A1 | 11/2013 | Ito et al. | |
| 2014/0206501 | A1 | 7/2014 | Ito et al. | |
| 2015/0300277 | A1* | 10/2015 | Stenlåås | B60W 30/1882 701/110 |
| 2016/0121903 | A1* | 5/2016 | Flaum | B60W 30/02 701/124 |
| 2019/0107069 | A1* | 4/2019 | Zhao | B60W 10/10 |

FOREIGN PATENT DOCUMENTS

| | | | |
|---|---|---|---|
| DE | 11 2011 104 629 | T5 | 10/2013 |
| DE | 10 2013 008 839 | A1 | 11/2014 |
| WO | 2015/004639 | A2 | 1/2015 |

OTHER PUBLICATIONS

English translation and Written Opinion of the International Searching Authority dated Aug. 24, 2023 for international application PCT/EP2023/063210 on which this application is based.

* cited by examiner

METHOD AND DEVICE FOR DETERMINING A MOTOR REFERENCE TORQUE OF A MOTOR VEHICLE

CROSS-REFERENCE TO RELATED APPLICATIONS

This application is a continuation application of international patent application PCT/EP2023/063210, filed May 17, 2023, designating the United States and claiming priority from German application 10 2022 115 221.9, filed Jun. 20, 2022, and the entire content of both applications is incorporated herein by reference.

TECHNICAL FIELD

The disclosure relates to a method and a device for determining the engine reference torque, used in a controller of a motor vehicle, of the engine of the motor vehicle, and to a controller of a braking system of a motor vehicle having such a device and/or having hardware and/or software modules for carrying out the steps of such a method.

BACKGROUND

Anti-lock braking systems (ABS) or electronic braking systems (EBS) are often installed in conventional commercial vehicles, the systems using a value for the engine reference torque (or maximum engine torque) for internal calculations, for example for engine drag torque control (MSR). The value for the engine reference torque is often transmitted by the engine controller of the vehicle or by its transmission controller via the CAN bus of the vehicle.

However, in the case of special types of CAN bus or special vehicle types or under error conditions, the ABS or EBS systems do not receive information about the engine reference torque from the CAN bus of the vehicle. This can be due, for example, to specifications of the vehicle manufacturers.

Furthermore, in the case of hybrid vehicles—that is, vehicles having a hybrid drive, which in most cases contains an electric motor in addition to a combustion engine—the information about the engine reference torque of the combustion engine is not sufficient as the relevant engine reference torque, since the additional drive would be disregarded.

SUMMARY

It is an object of the disclosure to determine the engine reference torque independently of information about the engine reference torque that is optionally transmitted via a CAN bus.

The disclosure, for example, achieves this object via a method for determining the engine reference torque, used in a controller of a motor vehicle, of the engine (maximum engine torque) of the motor vehicle which provides that the engine reference torque is determined by estimation. To this end, a value for the mass of the motor vehicle is determined. In addition, a motor vehicle velocity value is determined at each of two different times during acceleration of the motor vehicle. Acceleration in this context means only positive acceleration, that is, not braking, that is, the vehicle travels more quickly at the later time than at the earlier time.

The object is, for example, also achieved via a device for determining an engine reference torque, used in a controller of a motor vehicle, of an engine of the motor vehicle. The device includes: a computer configured to calculate an engine power (P', P) of the engine from a value for a mass (m) of the motor vehicle and from motor vehicle velocity values (v(t1), v(t2)) obtained at two different times (t1, t2) during acceleration of the motor vehicle; and, an estimator configured to estimate a value for the engine reference torque (MRM) via the calculated engine power (P', P) on a basis of power and torque curves, which are stored as a function of the speed (nM) of the engine.

The object is, for example, also achieved via a controller of a braking system of a motor vehicle. The controller includes: a processor; a non-transitory computer readable storage medium having program code stored thereon; the program code being configured, when executed by the processor, to: determine a value for a mass (m) of the motor vehicle and a motor vehicle velocity value (v(t1), v(t2)) determined at each of two different times (t1, t2) during acceleration of the motor vehicle; calculate an engine power (P'; P) of an engine from the value for the mass (m) and the motor vehicle velocity value (v(t1), v(t2); and, estimate a value for the engine reference torque (MRM) via the calculated engine power (P'; P) on a basis of power and torque curves, which are stored as a function of a speed (nM) of the engine.

The vehicle velocity values can be determined, for example, from wheel speeds of the vehicle. This is advantageous since, in modern braking systems, such as ABS braking systems and EBS braking systems, wheel speed sensors are installed at all the wheels or at least at a plurality of wheels, the sensors providing wheel speeds from which the vehicle velocity can be determined with a low outlay and therefore inexpensively.

The instantaneous engine power of the engine is calculated from the value for the mass of the vehicle and the two vehicle velocity values. Preferably, the calculation is effected on the basis of the equation of motion for a moving vehicle.

Starting from the calculated engine power, a value for the engine reference torque is estimated on the basis of power and torque curves, which are stored as a function of the speed of the engine in the controller or in another module of the vehicle. The estimation of the engine reference torque can, but does not have to, take account of the speed of the engine, since the engine torque can be inferred directly from the engine power.

If a current engine torque cannot be clearly associated with a current engine power—for example because two different engine torques were to come into consideration for a specific engine power—the previous or preceding curve of the engine power can be taken into account, which allows the engine power to be clearly associated with the engine torque.

The determination according to the disclosure of the engine reference torque (maximum engine torque) allows a value for the engine reference torque to be determined independently of the CAN bus, taking account of the actual performance characteristics of the drive of a motor vehicle.

The determination according to the disclosure of the engine reference torque is therefore also suitable in the case of special vehicle CAN types or under error conditions, in the case of which it is usually not possible to obtain information or correct information about the engine reference torque via the CAN bus of the vehicle.

A particular advantage of the disclosure is that the engine reference torque can be inferred with only a small number of input variables. Further information from the engine or transmission is not required.

Overall, the disclosure makes it possible for engine drag torque control to be provided with high efficiency, without the need for a signal via the CAN bus with information about the engine reference torque.

A device according to the disclosure for determining the engine reference torque, used in a controller of a motor vehicle, includes a computer, which calculates an engine power of the engine of the motor vehicle from a value for the mass of the motor vehicle and from vehicle velocity values, which are obtained at two different times during acceleration of the vehicle.

The device further includes an estimator, which estimates a value for the engine reference torque via the calculated engine power on the basis of power and torque curves, which are stored as a function of the speed of the engine in the controller or in another module.

Preferably, the device includes (further) hardware and/or software modules for carrying out the steps of the method according to the disclosure and of the developments thereof explained hereinbelow.

The controller according to the disclosure of a braking system of a motor vehicle includes a device for determining the engine reference torque of the above-mentioned type and/or hardware and/or software modules for carrying out the steps of the method according to the disclosure and of the developments thereof explained hereinbelow.

According to an embodiment of the disclosure, the two times are chosen to be so close to one another in time that the acceleration values of the motor vehicle at those times do not differ significantly from one another. This allows the model of a constantly accelerated movement to be used as the basis. Furthermore, the influence of other driving resistances can be kept to a minimum in this way.

An embodiment of the disclosure provides that the mass of the motor vehicle is determined from pneumatic spring pressures measured at the motor vehicle. The pneumatic spring pressures are dependent on the load of the motor vehicle and thus are dependent overall on the mass of the vehicle. The pneumatic spring pressures can therefore give an indication of the mass of the motor vehicle. The use of the pneumatic spring pressures for determining the motor vehicle mass is advantageous since it thus avoids the motor vehicle, together with its load, having to be weighed on a weighing machine. Weighing on a weighing machine is disadvantageous since it is associated with a not inconsiderable outlay, in particular since a mass obtained by weighing would additionally have to be made known to the vehicle and its controllers. This outlay can be avoided by virtue of this embodiment of the disclosure.

According to an embodiment of the disclosure, the engine power is calculated as follows:

$$P = \frac{m}{2} \cdot \frac{v(t2)^2 - v(t1)^2}{t2 - t1}$$

wherein P is the engine power, m is the determined value of the mass of the motor vehicle, v(t1) is the value of the motor vehicle velocity determined at time t1, and v(t2) is the value of the motor vehicle velocity determined at time t2. For this calculation of the engine power, the simplified basic energy equations $$\Delta E = \frac{m}{2} \cdot \left(v(t2)^2 - v(t1)^2\right)$$

-continued and $$P = \frac{\Delta E}{\Delta t} = \frac{\Delta E}{t2 - t1}$$

are used, wherein E denotes the kinetic energy of the motor vehicle and thus ΔE/Δt denotes the change in the kinetic energy of the motor vehicle with respect to time. The vehicle here travels more quickly at time t2 than at time t1, since the times lie within an acceleration phase of the motor vehicle.

An embodiment of the disclosure provides that, when calculating the engine power, one or more of the following correction factors are taken into account:

- correction factor $corr_{a,rot}$, which represents an acceleration of rotating masses of the motor vehicle, for example of the wheels and/or of rotating masses in the engine and drive train,
- correction factor $corr_R$, which represents a rolling resistance of the wheels of the motor vehicle,
- correction factor $corr_L$, which represents an air resistance of the motor vehicle,
- correction factor $corr_{St}$, which represents a climbing resistance of a gradient of the road used by the motor vehicle,
- correction factor $corr_{div}$, which represents further frictional resistances.

Taking these correction factors into account has the result that the calculated engine power takes account only of the energy for the translational acceleration in the plane. Other driving resistances, which would contribute to an incorrect determination of the engine reference torque, are thus eliminated.

Depending on the vehicle type, and thus the intended use, and/or depending on the driving situation, either none, only one, only a selection or all of the correction factors are used. In the case of a selection of the correction factors, all possible combinations come into consideration, that is, of the five correction factors mentioned above, in particular 1st correction factor with 2nd, 1st with 3rd, 1st with 4th, 1st with 5th, 2nd with 3rd, 2nd with 4th, 2nd with 5th, 3rd with 4th, 3rd with 5th, 4th with 5th, 1st with 2nd with 3rd, 1st with 2nd with 4th, 1st with 2nd with 5th, 1st with 3rd with 4th, 1st with 3rd with 5th, 1st with 4th with 5th, 2nd with 3rd with 4th, 2nd with 3rd with 5th, 2nd with 4th with 5th, 3rd with 4th with 5th, 1st with 2nd with 3rd with 4th, 1st with 2nd with 3rd with 5th, 1st with 2nd with 4th with 5th, 1st with 3rd with 4th with 5th, 2nd with 3rd with 4th with 5th, etc.

According to an embodiment of the disclosure, one or more of the correction factors are or have been determined in dependence on the velocity. Typically, the air resistance of a motor vehicle is dependent on the velocity; it can be assumed that the air resistance increases quadratically with the velocity.

Furthermore, the correction factor $corr_{a,rot}$, which represents an acceleration of rotating masses of the motor vehicle, for example of the wheels and/or of rotating masses in the engine and drive train, is dependent on the velocity; it can be assumed that the kinetic energy stored in rotating masses increases with the speed of rotation, or rotational velocity, of the rotating masses.

Other phenomena can act on the further correction factors.

When taking account of the correction factors, a preliminary engine power is first calculated without taking account of correction factors; the value of the preliminary engine power is then multiplied by the correction factor or factors which are to be taken into account, which gives the calculated engine power.

Due to these correction factors being taken into account, a higher accuracy in the estimation of the engine reference torque is achieved.

An embodiment of the disclosure provides that the engine reference torque is estimated repeatedly, wherein state models of the motor vehicle are taken into account and/or recursive or iterative estimation algorithms, for example using a Kalman filter, are used. As a result, a higher accuracy in the estimation of the engine reference torque is likewise achieved.

According to an embodiment of the disclosure, the times at which motor vehicle velocity values are determined are checked for their suitability and, if it is established that a time is unsuitable, the associated motor vehicle velocity value is discarded or filtered out. This procedure is advantageous since unsuitable velocity values thus do not falsify the estimation of the engine reference torque.

An embodiment of the disclosure provides that, when checking the suitability of the times, signals from a braking system of the motor vehicle, for example from a controller of an anti-lock braking system or of an electronic braking system, are taken into account, which signals can indicate unsuitable motor vehicle behavior. In this manner, driving states that are disadvantageous for the estimation of the engine reference torque can be excluded.

According to an embodiment of the disclosure, these signals include a brake actuation signal for signaling brake actuation and/or an ABS activation signal for signaling activation of an anti-lock braking system. Information that is present in braking systems can thus be used to improve the estimation of the engine reference torque.

An embodiment of the disclosure provides that a climbing resistance is calculated via an inclination sensor, and the correction factor $corr_{St}$, which represents a climbing resistance of a gradient of the road used by the motor vehicle, is calculated in dependence on the calculated climbing resistance, and/or, when an inclination is recognized via a gradient angle, generated by the inclination sensor, that is outside a predetermined range, a motor vehicle velocity value determined at the same time is excluded or declared to be unsuitable. In this manner, measurements on uneven sections can be discarded and do not falsify the estimation of the engine reference torque.

According to an embodiment of the disclosure, the engine power is continuously calculated repeatedly and a maximum value of the engine power Pmax is determined by replacement of an already existing value for Pmax with a greater calculated value of the engine power, provided that the greater calculated value has previously been evaluated as being reliable. In this manner, the motor vehicle, or one of its controllers, receives, after a certain observation period, the maximum engine power solely from measurements and calculations during driving operation. The maximum engine power therefore does not have to be programmed into corresponding controllers. This is advantageous in particular when the engine power is unknown during manufacture of such controllers because it is still unclear into which vehicle such a controller will be installed.

An embodiment of the disclosure provides that measured engine speed information or engine speed information derived from information about an engaged gear and a wheel speed is used, and the engine reference torque is determined from the engine speed information and the engine power.

According to an embodiment, the engine reference torque is continuously estimated repeatedly and a maximum value of the engine reference torque is determined by replacement of an already existing value for the maximum value with a greater estimated value of the engine reference torque, provided that the greater estimated value has been evaluated as being reliable.

A particular advantage of the disclosure is that no information about the clutch state of the vehicle has to be available, since maximum acceleration values are in principle achieved only when the clutch is closed.

The disclosure can be applied both in conventional vehicles, in particular vehicles having a combustion engine, and in parallel hybrid vehicles, where the input speeds of the transmission typically lie within the working range of a diesel engine.

BRIEF DESCRIPTION OF DRAWINGS

The invention will now be described with reference to the drawings wherein.

DETAILED DESCRIPTION

Figure 1:
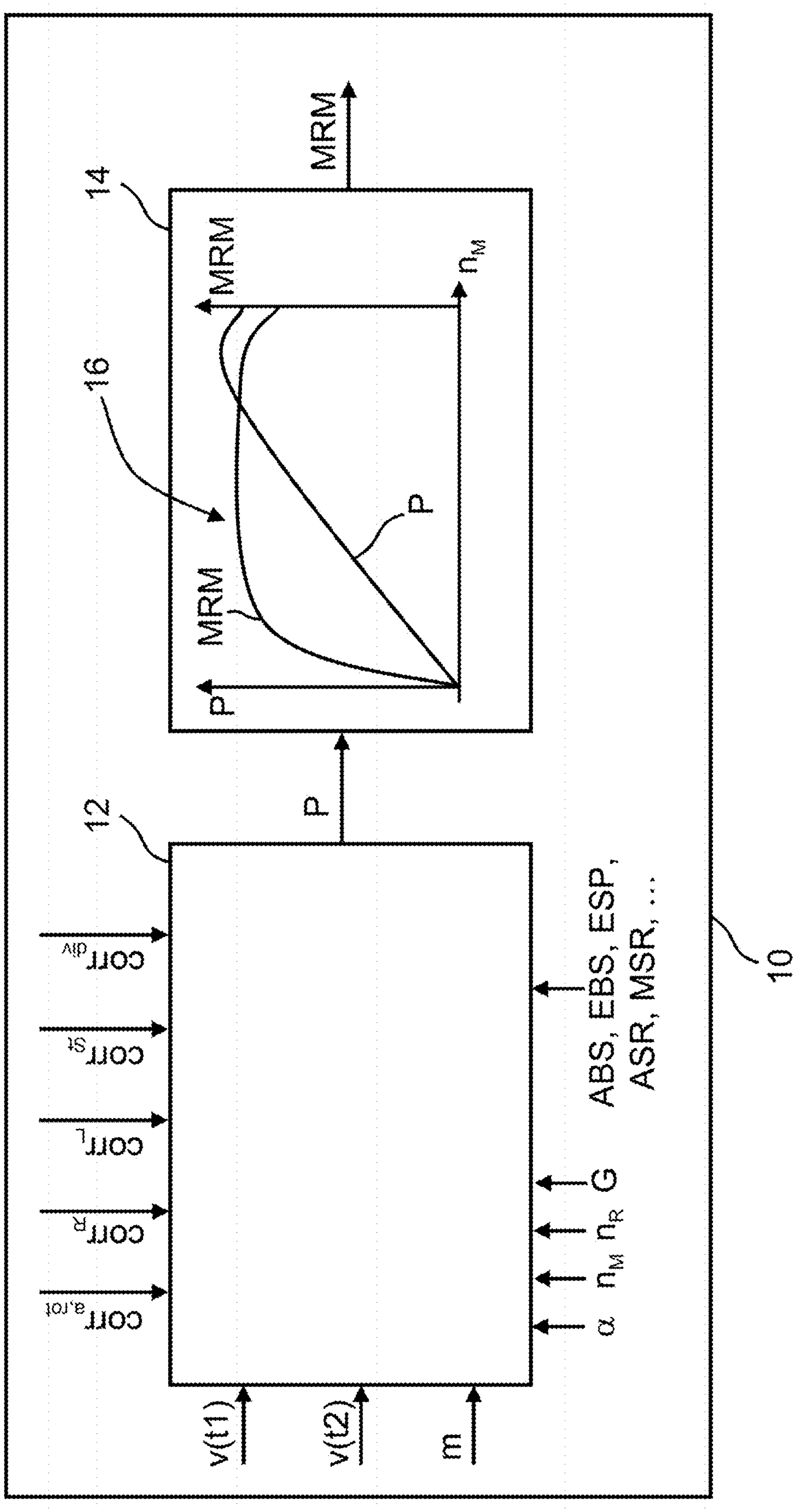
FIG. 1 shows an embodiment of a device according to the disclosure for determining the engine reference torque of the engine of a motor vehicle.

FIG. 1 shows an embodiment of a device 10 according to the disclosure for determining the engine reference torque of the engine of a motor vehicle.

The engine of a motor vehicle is understood as being the engine system, which in the simplest case includes only a combustion engine but in more highly developed engine systems, for example hybrid vehicles, includes the totality of the drive units, for example a combustion engine as well as one or more electric motors, which serve to drive the vehicle. Depending on the operating mode, a hybrid vehicle is driven either only by the electric motor or motors or the combustion engine or simultaneously by the combustion engine and the electric motor or motors. The engine reference torque denotes the maximum torque of all the drive units together.

The device 10 is part of a motor vehicle, in particular part of one of its system components.

The device 10 includes a computer 12 and an estimator 14.

The computer 12 receives various variables and parameters, in particular a value for the mass m of the motor vehicle and two motor vehicle velocity values v(t1), v(t2) obtained at different times t1 and t2. The motor vehicle velocity values v(t1), v(t2) can be determined, for example, from wheel speeds, which are obtained from wheel speed sensors. Such wheel speed sensors are generally installed in vehicles which have an anti-lock braking system or an electronic braking system. The vehicle velocity values v(t1), v(t2) can, for example, also be transmitted directly to the device 10 by a controller of an anti-lock braking system or of an electronic braking system.

The mass m of the motor vehicle can be determined, for example, from pneumatic spring pressures measured at the motor vehicle. For this purpose, a pressure in the pneumatic spring system is measured and the mass m of the motor vehicle is calculated from the measured pressure.

Determination of the mass m of the motor vehicle is expedient in particular in the case of commercial vehicles, since the load of a commercial vehicle can change significantly and a loaded commercial vehicle can therefore reach a multiple of the mass of the same commercial vehicle without a load.

The computer 12 first calculates an engine power P from the values of the mass m and the motor vehicle velocity values v(t1), v(t2) via the equation $$P = \frac{m}{2} \cdot \frac{v(t2)^2 - v(t1)^2}{t2 - t1}.$$

Preferably, the engine power so calculated is considered to be only a preliminary value P', which is corrected by one or more of the correction factors by multiplication of the preliminary value P' by one or more of the correction factors.

The correction factors include the following variables:

- a correction factor $corr_{a,rot}$, which represents an acceleration of rotating masses of the motor vehicle,
- a correction factor $corr_R$, which represents a rolling resistance of the wheels of the motor vehicle,
- a correction factor $corr_L$, which represents an air resistance of the motor vehicle,
- a correction factor $corr_{St}$, which represents a climbing resistance of a gradient of the road used by the motor vehicle,
- a correction factor $corr_{div}$, which represents further frictional resistances.

The value for the engine power P that is outputted by the computer 12 is therefore given by multiplication of the preliminary value P' by the correction factor $corr_{a,rot}$, the correction factor $corr_R$, the correction factor corn, the correction factor $corr_{St}$ and/or the correction factor $corr_{div}$.

The computer 12 can receive further variables and parameters, such as the inclination or gradient a of the vehicle, which can be measured via an inclination sensor.

The computer 12 can further receive the speed of the engine $n_M$ determined by measurement or—where present—the speeds of further motors, in particular in the case of hybrid vehicles.

The computer 12 can further receive the speed of a wheel $n_R$ or speeds of a plurality of wheels determined by measurement. The computer 12 can further receive information about the engaged gear G. The computer 12 is able to derive the engine speed from the information about the engaged gear G and from the determined wheel speed $n_R$.

The computer 12 further receives information about any interventions for actuation of the wheel brakes or the engine speed from an anti-lock braking system ABS, an electronic braking system EBS, an electronic stability control system ESP, an anti-slip regulation system ASR and/or an engine drag torque control system MSR. From this information, it is derived whether the vehicle velocity values v(t1), v(t2) used are suitable or unsuitable within the context of the estimation of the engine reference torque. These motor vehicle velocity values v(t1), v(t2) are generally unsuitable if they have been determined during an intervention of one of these systems. If it is established that the motor vehicle velocity values v(t1), v(t2) are unsuitable, either the power calculation is not carried out at all or a power value P that has been obtained is discarded.

The computer 12 transmits suitable power values P to the estimator 14. The estimator 14 estimates a value for the engine reference torque MRM via the calculated engine power P on the basis of power and torque curves 16, which are stored as a function of the speed of the engine $n_M$. This value is processed further by the device 10, optionally taking account of state models of the motor vehicle and/or recursive and interactive estimation algorithms, for example using a Kalman filter.

Finally, the device 10 provides a value for the engine reference torque MRM to one or more controllers of the motor vehicle, such as, for example, a controller for engine drag torque control, an ABS controller or an EBS controller.

Figure 2:
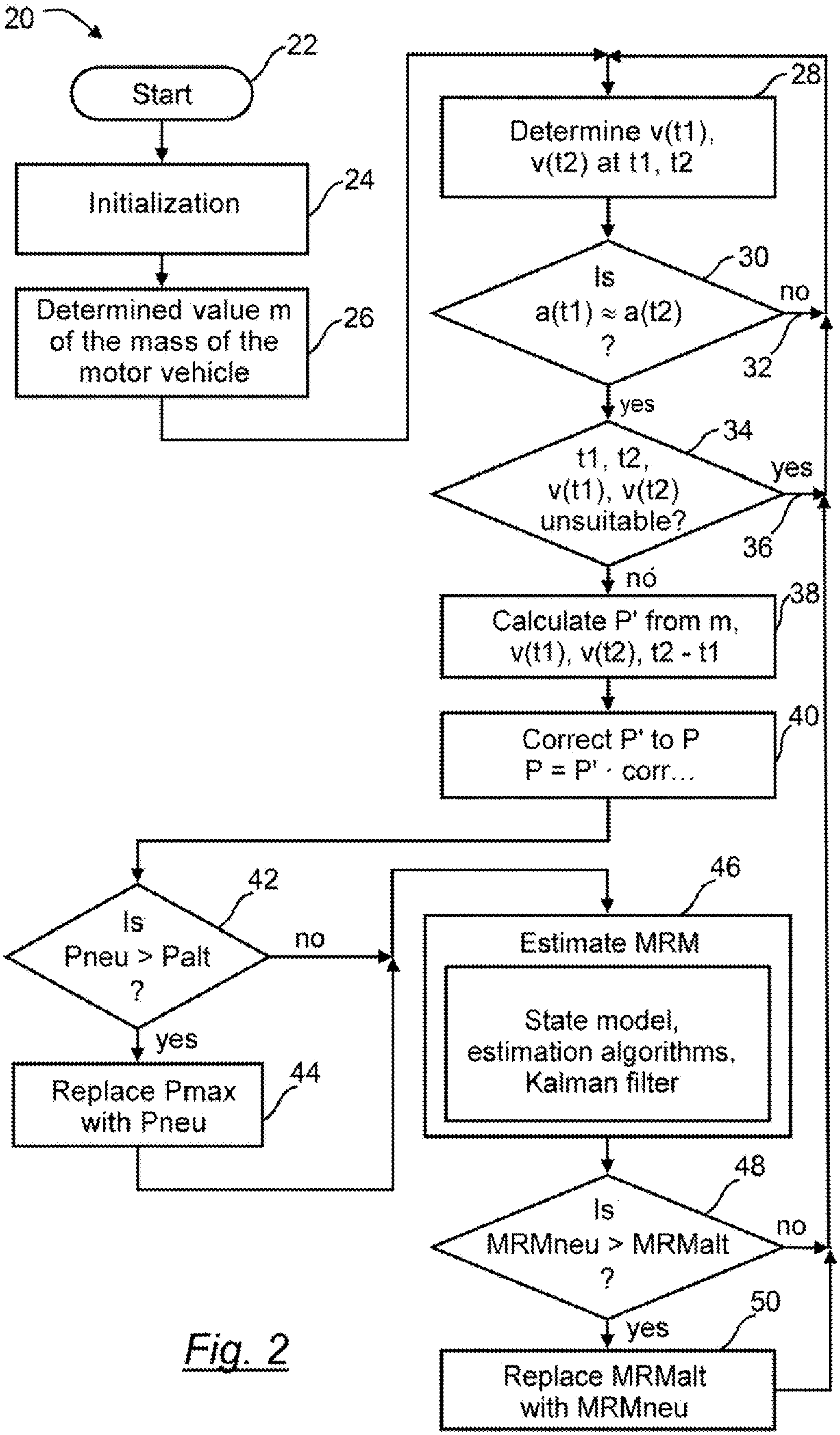
FIG. 2 shows an embodiment of a method according to the disclosure for determining the engine reference torque using a device according to FIG. 1.

FIG. 2 shows an example of a procedure 20 for determining the engine reference torque MRM.

After the start 22 of the method 20, method parameters are first initialized in an initialization step 24.

In a determination step 26, a value m of the mass of the motor vehicle is determined as described above, for example on the basis of pressures in the pneumatic suspension system.

In a further determination step 28, a motor vehicle velocity value v(t1), v(t2) is determined at each of two different times t1 and t2 during acceleration of the motor vehicle.

In a checking step 30, it is checked whether the acceleration of the motor vehicle was approximately equal at the two times, in order to ensure that an approximately constantly accelerated movement of the motor vehicle is present. If that is not the case, the procedure branches back to determination step 28 via branch 32.

If an approximately constantly accelerated movement of the motor vehicle is present, it is checked in a further checking step 34 whether times t1 and t2 as well as the motor vehicle velocity values v(t1), v(t2) are suitable. To this end, it is checked whether the times were sufficiently close together that a constantly accelerated movement can be assumed with sufficiently high accuracy. In addition—as explained above—it is checked whether any interventions by driver assistance systems, such as by an anti-lock braking system ABS, an electronic braking system EBS, an electronic stability control system ESP, an anti-slip regulation system ASR and/or an engine drag torque control system MSR, were present at times t1 and t2, in order to declare the vehicle velocity values v(t1), v(t2) to be unsuitable if appropriate.

Furthermore, when an inclination is recognized via a gradient angle, generated by the inclination sensor, that is outside a predetermined range, a motor vehicle velocity value determined at the same time is excluded or declared to be unsuitable.

If it has been established that the values, in particular the motor vehicle velocity values, used are unsuitable, the procedure branches back to determination step 28 via branch 36.

In a calculation step 38, a preliminary value for the engine power P' is calculated from the mass m of the motor vehicle as well as the motor vehicle velocity values v(t1), v(t2) and the time difference t2–t1 of the two times t1 and t2.

In a following correction step 40, the preliminary value for the engine power P' is corrected by multiplication by one or more of the above-mentioned correction factors.

In a checking step 42, it is checked whether the calculated and optionally corrected instantaneous engine power Pneu is greater than a previously calculated and optionally corrected engine power Palt. If that is the case, the method branches to replacement step 44, in which a previously stored maximum value Pmax is replaced with the instantaneous value for the engine power Pneu, and the method continues with an estimation step 46.

If, however, it is established in checking step 42 that the calculated and optionally corrected instantaneous engine power Pneu is not greater than a previously calculated and optionally corrected engine power Palt, replacement step 44 is skipped and the method continues with estimation step 46.

In estimation step 46, the engine reference torque MRM is estimated. Since steps 28, 30, 34, 38, 40, 42 and 44, which have been discussed, are continuously carried out repeatedly, the engine reference torque is also estimated repeatedly. State models of the motor vehicle can here be used, and/or recursive or iterative estimation algorithms can be incorporated, for example by Kalman filters. Unsuitable values can be recognized and filtered out.

In a checking step 48, it is checked whether the instantaneously estimated engine reference torque MRMneu is greater than the previously estimated engine reference torque MRMalt. If that is the case, the method branches to replacement step 50, in which a previously stored engine reference torque MRMalt is replaced with the instantaneously estimated engine reference torque MRMneu, and the method continues with determination step 28.

If, however, it is established in checking step 48 that the instantaneously estimated engine reference torque MRMneu is not greater than the previously estimated engine reference torque MRMalt, replacement step 50 is skipped and the method continues with determination step 28.

Figure 3:
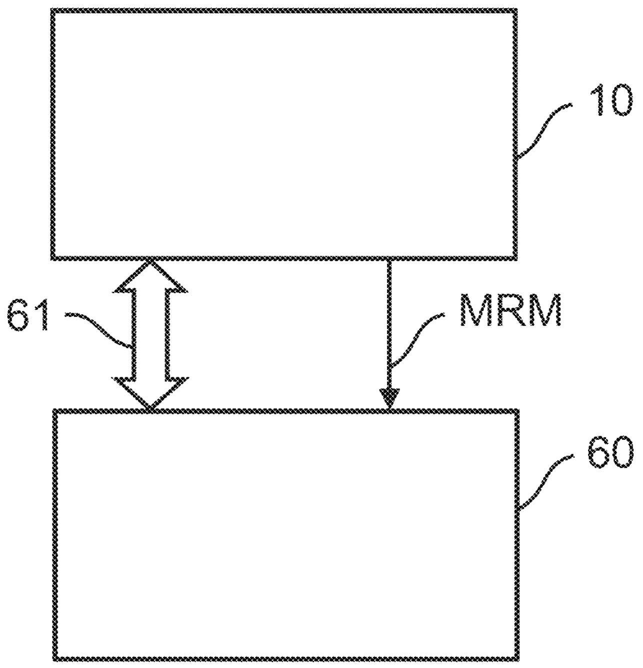
FIG. 3 shows an embodiment of an arrangement of the device shown in FIG. 1 outside a controller which uses the engine reference torque; and, FIG. 4 shows an embodiment of an alternative arrangement of the device shown in FIG. 1 inside a controller which uses the engine reference torque.

FIG. 3 shows an arrangement of the device 10 shown in FIG. 1 outside a controller 60, which receives the engine reference torque MRM from the device 10 and uses it. Via a data link 61, data, in particular the parameters explained in connection with FIG. 1, can be exchanged between the controller 60 and the device 10.

Figure 4:
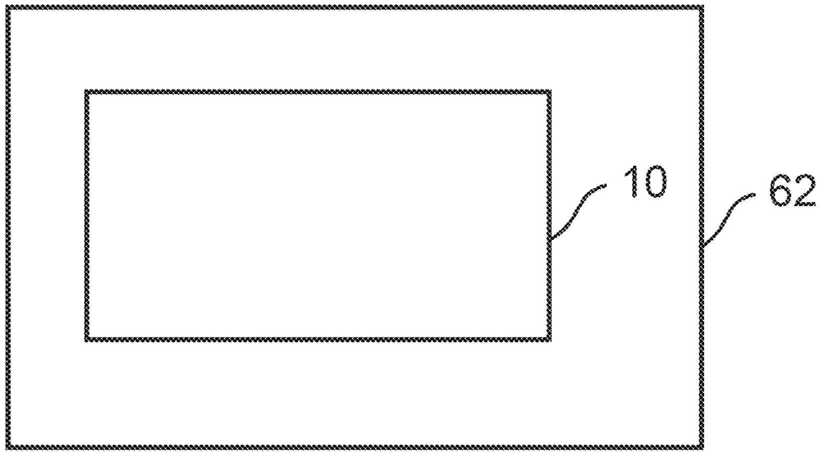

FIG. 4 shows an alternative arrangement of the device 10 shown in FIG. 1 inside such a controller 62 which uses the engine reference torque MRM.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

10 device
12 computer
14 estimator
16 power and torque curves
20 procedure
22 start
24 initialization step
26 determination step
28 determination step
30 checking step
32 branch
34 checking step
36 branch
38 calculation step
40 correction step
42 checking step
44 replacement step
46 estimation step
48 checking step
50 replacement step
60 controller
61 data link
62 controller
m mass of the motor vehicle
t1 time
t2 time
v(t1) motor vehicle velocity value at time t1
v(t2) motor vehicle velocity value at time t2
a(t1) motor vehicle acceleration value at time t1
a(t2) motor vehicle acceleration value at time t2
$corr_{a,rot}$ correction factor representing the acceleration of rotating masses of the motor vehicle
$corr_R$ correction factor representing the rolling resistance of the wheels of the motor vehicle
$corr_L$ correction factor representing the air resistance of the motor vehicle
$corr_{St}$ correction factor representing the climbing resistance
$corr_{div}$ correction factor representing further frictional resistances
α inclination/gradient
$N_M$ engine speed
$N_R$ wheel speed
G gear
MRM engine reference torque
MRMneu instantaneous engine reference torque
MRMalt previous engine reference torque
P engine power
P' preliminary engine power
Pneu instantaneous engine power
Palt previous engine power
Pmax maximum engine power
ABS anti-lock braking system
EBS electronic braking system
ESP electronic stability control system
ASR anti-slip regulation system
MSR engine drag torque control system

The invention claimed is:

1. A method for determining an engine reference torque (MRM), used in a controller of a motor vehicle, of an engine of the motor vehicle, the method comprising:
- determining a value for a mass (m) of the motor vehicle and a motor vehicle velocity value (v(t1), v(t2)) determined at each of two different times (t1, t2) during acceleration of the motor vehicle;
  - calculating an engine power (P'; P) of the engine from the value for the mass (m) and the motor vehicle velocity value (v(t1), v(t2)); and,
- estimating a value for the engine reference torque (MRM) via the calculated engine power (P'; P) on a basis of power and torque curves, which are stored as a function of a speed ($n_M$) of the engine;
- wherein the motor vehicle is controlled based on the engine reference torque (MRM).

2. The method of claim 1, wherein the two different times (t1, t2) are chosen to be so close to one another in time that acceleration values (a(t1), a(t2)) of the motor vehicle at the two different times (t1, t2) do not differ from one another.

3. The method of claim 1, wherein the value for the mass (m) of the motor vehicle is determined from pneumatic spring pressures measured at the motor vehicle.

4. The method of claim 1, wherein the engine power (P) is calculated as follows:

$$P = \frac{m}{2} \cdot \frac{v(t2)^2 - v(t1)^2}{t2 - t1}$$

wherein P is the engine power, m is the determined value of the mass of the motor vehicle, v(t1) is the value of the motor vehicle velocity determined at the time t1, and v(t2) is the value of the motor vehicle velocity determined at the time t2.

5. The method of claim 1, wherein, when calculating the engine power (P), at least one of following correction factors are taken into account:

correction factor $corr_{a,rot}$, which represents an acceleration of rotating masses of the motor vehicle;

correction factor $corr_R$, which represents a rolling resistance of wheels of the motor vehicle;

correction factor $corr_L$, which represents an air resistance of the motor vehicle;

correction factor $corr_{St}$, which represents a climbing resistance of a gradient of a road used by the motor vehicle, and, correction factor $corr_{div}$, which represents further frictional resistances.

6. The method of claim 1, wherein the engine reference torque (MRM) is estimated repeatedly; and, at least one of state models of the motor vehicle are taken into account and recursive or iterative estimation algorithms are applied.

7. The method of claim 1, wherein the engine reference torque (MRM) is estimated repeatedly; and, a Kalman filter is applied.

8. The method of claim 1, wherein the two different times (t1, t2) are checked for suitability and, if it is established that one of the two different times (t1, t2) is unsuitable, the associated motor vehicle velocity value (v(t1), v(t2)) is discarded or filtered out.

9. The method of claim 8, wherein, when checking the suitability of the two different times (t1, t2), signals from a braking system of the motor vehicle are taken into account; and, the signals indicate unsuitable motor vehicle behavior.

10. The method of claim 8, wherein, when checking the suitability of the two different times (t1, t2), signals from a controller of an anti-lock braking system or an electronic braking system are taken into account; and, the signals indicate unsuitable motor vehicle behavior.

11. The method of claim 8, wherein signals include at least one of a brake actuation signal for signaling brake actuation and an activation signal for signaling activation of an anti-lock braking system.

12. The method of claim 1 further comprising:

calculating a climbing resistance via an inclination sensor;

calculating a correction factor $corr_{St}$, which represents the climbing resistance, in dependence upon the climbing resistance; and/or, when an inclination is recognized via a gradient angle, generated by the inclination sensor, that is outside a predetermined range, a motor vehicle velocity value determined at a same time is excluded or declared to be unsuitable.

13. The method of claim 1, wherein the engine power (P) is continuously calculated repeatedly and a maximum value (Pmax) of the engine power is determined by replacement of an already existing maximum value (Pmax) of the engine power with a greater calculated value of the engine power (Pneu), provided that the greater calculated value (Pneu) has previously been evaluated as being reliable.

14. The method of claim 1, wherein measured engine speed information ($n_M$) or engine speed information ($n_M$) derived from information about an engaged gear and a wheel speed ($n_R$) is used; and, the engine reference torque (MRM) is determined from the measured engine speed information ($n_M$) and the engine power (P).

15. The method of claim 1, wherein the engine reference torque (MRM) is continuously estimated repeatedly and a maximum value of the engine reference torque (MRM) is determined by replacement of an already existing value (MRMalt) for the maximum value with a greater estimated value of the engine reference torque (MRMneu), provided that the greater estimated value of the engine reference torque (MRMneu) has been evaluated as being reliable.

16. A device for determining an engine reference torque (MRM), used in a controller of a motor vehicle, of an engine of the motor vehicle, the device comprising:

a computer configured to calculate an engine power (P', P) of the engine from a value for a mass (m) of the motor vehicle and from motor vehicle velocity values (v(t1), v(t2)) obtained at two different times (t1, t2) during acceleration of the motor vehicle; and, an estimator configured to estimate a value for the engine reference torque (MRM) via the calculated engine power (P', P) on a basis of power and torque curves, which are stored as a function of a speed ($n_M$) of the engine;

wherein the motor vehicle is controlled based on the engine reference torque (MRM).

17. A controller of a braking system of a motor vehicle, the controller comprising:

a processor;

a non-transitory computer readable storage medium having program code stored thereon;

said program code being configured, when executed by said processor, to:

determine a value for a mass (m) of the motor vehicle and a motor vehicle velocity value (v(t1), v(t2)) determined at each of two different times (t1, t2) during acceleration of the motor vehicle;

calculate an engine power (P'; P) of an engine from the value for the mass (m) and the motor vehicle velocity value (v(t1), v(t2); and, estimate a value for an engine reference torque (MRM) via the calculated engine power (P'; P) on a basis of power and torque curves, which are stored as a function of a speed ($n_M$) of the engine;

wherein the motor vehicle is controlled based on the engine reference torque (MRM).

18. A controller of a braking system of a motor vehicle, the controller comprising the device for determining the engine reference torque (MRM) of the engine of the motor vehicle of claim 16.

* * * * *